United States Patent
Kerby et al.

(10) Patent No.: US 10,995,287 B2
(45) Date of Patent: May 4, 2021

(54) OIL ANTI-FOULANT AND/OR ASPHALTENE AGGLOMERATION PROCESS

(71) Applicant: Infineum International Limited, Abingdon (GB)

(72) Inventors: Paul D. Kerby, Abingdon (GB); Andrew C. Sutkowski, Abingdon (GB); Krzysztof J. Maranski, Zagan (PL); Nichola Kyle, Abingdon (GB)

(73) Assignee: Infineum International Limited

( * ) Notice: Subject to any disclaimer, the term of this patent is extended or adjusted under 35 U.S.C. 154(b) by 0 days.

(21) Appl. No.: 16/707,253

(22) Filed: Dec. 9, 2019

(65) Prior Publication Data
US 2020/0224109 A1 Jul. 16, 2020

(30) Foreign Application Priority Data
Dec. 20, 2018 (EP) ..................................... 18214517

(51) Int. Cl.
*C10G 75/04* (2006.01)
*C10G 75/02* (2006.01)

(52) U.S. Cl.
CPC ............. *C10G 75/04* (2013.01); *C10G 75/02* (2013.01)

(58) Field of Classification Search
CPC .......... C10G 9/16; C10G 75/02; C10G 75/04; C10L 1/14; C10L 1/2493; C10L 10/04; C10L 10/18; C10L 10/1817; C10L 10/1883
See application file for complete search history.

(56) References Cited

U.S. PATENT DOCUMENTS

2007/0193535 A1* 8/2007 Garner ................... C10L 1/189
123/1 A
2014/0125301 A1 5/2014 Glass et al.

FOREIGN PATENT DOCUMENTS

| CN | 106701194 A | 5/2017 |
| EP | 3 029 133 A1 | 11/2003 |
| EP | 3 421 576 A1 | 1/2019 |

OTHER PUBLICATIONS

European Search report dated Jun. 3, 2019.

* cited by examiner

*Primary Examiner* — Brian A McCaig

(57) ABSTRACT

Fouling and/or asphaltene agglomeration (or flocculation) in midstream processes and transportation and in upstream transportation of a hydrocarbon oil is reduced by providing in the oil an additive combination including;

(A) a polyalkenyl-substituted carboxylic acid or anhydride, and (B) a metal detergent system comprising a hydrocarbyl-substituted hydroxybenzoate metal salt or a hydrocarbyl-substituted sulfonate metal salt or a mixure of both salts or a complex thereof, where the mass:mass ratio of (A) to (B) is in the range of 20:1 to 1:20 and the treat rate of the additive is in the range of 5 to 10000 ppm by mass.

18 Claims, No Drawings

OIL ANTI-FOULANT AND/OR ASPHALTENE AGGLOMERATION PROCESS

FIELD OF INVENTION

This invention relates to additives to reduce fouling and/or asphaltene agglomeration (or flocculation) in midstream processes and transportation and in upstream transportation of a hydrocarbon oil, in particular a crude oil.

BACKGROUND

Asphaltenes include a large number of structures such as high molecular weight fused aromatic compounds with heteroatoms; they are heterocyclic unsaturated macromolecules primarily of carbon and hydrogen but also containing minor components such as sulfur, oxygen, nitrogen and various heavy metals. They may be present in considerable amounts in hydrocarbon oils and may precipitate out and deposit during midstream processes and transportation and in upstream transportation of the oils with adverse consequences.

The art describes treatments by way of use of additives to solve this problem. For example, US-A-2017/0306215 ("'215") describes inhibiting asphaltene precipitation and/or deposition in a hydrocarbon by adding to the hydrocarbon an effective amount of a polyester asphaltene dispersing agent obtainable by reacting an alk(en)yl substituted succinic anhydride wherein the average number of succinic groups per alk(en)yl group is less than 2.0, with at least one polyol.

SUMMARY

The invention meets the above-mentioned problem in a different way from '215. It uses, for example, an unreacted succinic anhydride and that is in combination with a metal detergent, the efficacy of which is demonstrated in the EXAMPLES section of this specification.

In a first aspect the invention provides a method for reducing fouling and/or asphaltene agglomeration (or flocculation) in midstream processes and transportation and in upstream transportation of a hydrocarbon oil, including storage and blending, such as a crude oil, comprising providing in the oil an additive combination comprising:
  (A) a polyalkenyl-substituted carboxylic acid or anhydride, and
  (B) a metal detergent system comprising a hydrocarbyl-substituted hydroxybenzoate metal salt, or a hydrocarbyl-substituted sulfonate metal salt or a mixture of both salts or a complex thereof,
  where the mass:mass ratio of (A) to (B) is in the range of 20:1 to 1:20 such as 10:1 to 1:10, preferably 3:1 to 1:3, and the treat rate of the additive combination is in the range of 5, 10, 100 or 500 to 1000, 5000 or 10000, preferably 100 to 5000 such as 500 to 1000, ppm by mass.

In a second aspect the invention provides the use of the additive combination as defined above in a hydrocarbon oil to reduce fouling and/or asphaltene agglomeration or flocculation during midstream processes and transportation and in upstream transportation of the oil. Accordingly, in either aspect the fouling and/or asphaltene agglomeration or flocculation may be understood to arise from the hydrocarbon oil, such as crude oil, being subjected to the midstream processes and transportation and/or upstream transportation.

Definitions

The following definitions are provided for purpose of illustration and not limitation.

"Downstream" refers to any operations involving a hydrocarbon oil within an oil refinery, or thereafter, including transportation and exploitation of refined product.

"Midstream" refers to any operations involving the movement of hydrocarbon oil, typically crude oil, from upstream storage usually located at or near an oil field to an oil refinery, for example up to and including storage and piping immediately prior to the hydrocarbon oil entering the oil refinery.

"Upstream" refers to any operations involving the extraction (production) of hydrocarbon oil, typically crude oil, usually from a well, to a storage component usually located at or near an oil field in preparation for further movement of the hydrocarbon oil towards a refinery.

"Crude oil" refers to the hydrocarbon fossil fuel oil originally located underground which is extracted, transported and subsequently refined in a petroleum refinery operation at a petroleum refinery. The term "crude oil" embraces a single type of crude oil or a crude oil blend comprising two or more different types of crude oil. Crude oil embraces intermediate (light) crude oils, medium crude oils, heavy crude oils and shale oils;

"Alkyl" refers to a monovalent hydrocarbon group containing no double or triple bonds and arranged in a branched or straight chain.

"Alkylene" refers to a divalent hydrocarbon group containing no double or triple bonds and arranged in a branched or straight chain.

"Alkenyl" refers to a monovalent hydrocarbon group containing one or more double bonds and arranged in a branched or straight chain.

"PIB" refers to polyisobutylene and includes both normal or "conventional" polyisobutylene and highly reactive polyisobutylene (HRPIB).

Reference to a group being a particular polymer (e.g., polypropylene, polyethylene-co-propylene) or PIB) encompasses polymers that contain primarily the respective monomer along with negligible amounts of other substitutions and/or interruptions along a polymer chain. In other words, reference to a group being a polypropylene group does not require that the group consist of 100% propylene monomers without any linking groups, substitutions, impurities or other substituents (e.g. alkylene or alkenylene substituents). Such impurities or other substituents may be present in relatively minor amounts provided they do not affect the industrial performance of the additive, compared with the same additive containing the respective polymer substituent at 100% purity.

"Hydrocarbyl" means a group or radical that contains carbon and hydrogen atoms and that is bonded to the remainder of the molecule via a carbon atom. It may contain hetero atoms, i.e. atoms other than carbon and hydrogen, provided they do not alter the essentially hydrocarbon nature and characteristics of the group.

Also, the following words and expressions, if and when used, have the meanings ascribed below:

"active ingredients" or "(a.i.)" refers to additive material that is not diluent or solvent;

"comprising" or any cognate word specifies the presence of stated features, steps, or integers or components, but does not preclude the presence or addition of one or more other features, steps, integers, components or groups thereof; the expressions "consists of" or "consists essentially of" or cognates may be embraced within "comprises" or cognates, wherein "consists essentially of" permits inclusion of substances not materially affecting the characteristics of the composition to which it applies;

"major amount" means 50 mass % or more, preferably 60 mass % or more, more preferably 70 mass % or more, even more preferably 80 mass <Y0 or more, of a composition;

"minor amount" means less than 50 mass %, preferably less than 40 mass %, more preferably less than 30 mass %, and even more preferably less than 20 mass %, of a composition;

"TBN" means total base number as measured by ASTM D2896.

Furthermore in this specification, if and when used:
"calcium content" is as measured by ASTM 4951;
"phosphorus content" is as measured by ASTM D5185;
"sulphated ash content" is as measured by ASTM D874;
"sulphur content" is as measured by ASTM D2622;
"KV100" means kinematic viscosity at 100° C. as measured by ASTM D445.

Also, it will be understood that various components used, essential as well as optimal and customary, may react under conditions of formulation, storage or use and that the invention also provides the product obtainable or obtained as a result of any such reaction.

Further, it is understood that any upper and lower quantity, range and ratio limits set forth herein may be independently combined.

DETAILED DESCRIPTION

Polyalkenyl-Substituted Carboxylic Acid or Anhydride (A)

It may be mono or polycarboxylic, preferably dicarboxylic. The polyalkenyl group preferably has from 8 to 400, such as 12 to 100, carbon atoms.

General formulae of exemplary anhydrides within (A) may be depicted as

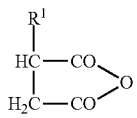

where $R^1$ represents a $C_8$ to $C_{100}$ branched or linear polyalkenyl group.

The polyalkenyl moiety may have a number average molecular weight of from 200 to 10000, such as 350 to 2000, preferably 500 to 1000.

Suitable hydrocarbons or polymers employed in the formation of the anhydrides used in the present invention to generate the polyalkenyl moieties include homopolymers, interpolymers or lower molecular weight hydrocarbons. One family of such polymers comprise polymers of ethylene and/or at least one $C_3$ to $C_{28}$ alpha-olefin having the formula $H_2C=CHR^1$ wherein $R^1$ is straight or branched-chain alkyl radical comprising 1 to 26 carbon atoms and wherein the polymer contains carbon-to-carbon unsaturation, preferably a high degree of terminal ethenylidene unsaturation. Preferably, such polymers comprise interpolymers of ethylene and at least one alpha-olefin of the above formula, wherein $R^1$ is alkyl of from 1 to 18, more preferably from 1 to 8, and more preferably still from 1 to 2, carbon atoms. Therefore, useful alpha-olefin monomers and comonomers include, for example, propylene, butene-1, hexene-1, octene-1, 4-methylpentene-1, decene-1, dodecene-1, tridecene-1, tetradecene-1, pentadecene-1, hexadecene-1, heptadecene-1, octadecene-1, nonadecene-1, and mixtures thereof (e.g., mixtures of propylene and butene-1). Exemplary of such polymers are propylene homopolymers, butene-1 homopolymers, ethylene-propylene copolymers, ethylene-butene-1 copolymers, and propylene-butene copolymers, wherein the polymer contains at least some terminal and/or internal unsaturation. Preferred polymers are unsaturated copolymers of ethylene and propylene and ethylene and butene-1. The interpolymers may contain a minor amount, e.g. 0.5 to 5 mol %, of a $C_4$ to $C_{18}$ non-conjugated diolefin comonomer. However, it is preferred that the polymers comprise only alpha-olefin homopolymers, interpolymers of alpha-olefin comonomers and interpolymers of ethylene and alpha-olefin comonomers. The molar ethylene content of the polymers employed is preferably in the range of 0 to 80, more preferably 0 to 60, %. When propylene and/or butene-1 are employed as comonomer(s) with ethylene, the ethylene content of such copolymers is most preferably between 15 and 50%, although higher or lower ethylene contents may be present.

These polymers may be prepared by polymerizing an alpha-olefin monomer, or mixtures of alpha-olefin monomers, or mixtures comprising ethylene and at least one $C_3$ to $C_{28}$ alpha-olefin monomer, in the presence of a catalyst system comprising at least one metallocene (e.g., a cyclopentadienyl-transition metal compound) and an alumoxane compound. Using this process, a polymer in which 95% or more of the polymer chains possess terminal ethenylidene-type unsaturation can be provided. The percentage of polymer chains exhibiting terminal ethenylidene unsaturation may be determined by FTIR spectroscopic analysis, titration, or $C^{13}$ NMR. Interpolymers of this latter type may be characterized by the formula POLY-C($R^1$)=$CH_2$ wherein $R^1$ is $C_1$ to $C_{26}$, preferably $C_1$ to $C_{18}$, more preferably $C_1$ to $C_8$, and most preferably $C_3$ to $C_2$, alkyl, (e.g., methyl or ethyl) and wherein POLY represents the polymer chain. The chain length of the $R^1$ alkyl group will vary depending on the comonomer(s) selected for use in the polymerization. A minor amount of the polymer chains can contain terminal ethenyl, i.e., vinyl, unsaturation, i.e. POLY-CH=$CH_2$, and a portion of the polymers can contain internal monounsaturation, e.g. POLY-CH=CH($R^1$), wherein $R^1$ is as defined above. These terminally unsaturated interpolymers may be prepared by known metallocene chemistry and may also be prepared as described in U.S. Pat. Nos. 5,498,809; 5,663,130; 5,705,577; 5,814,715; 6,022,929 and 6,030,930.

Another useful class of polymers is that of polymers prepared by cationic polymerization of isobutene and styrene. Common polymers from this class include polyisobutenes obtained by polymerization of a $C_4$ refinery stream having a butene content of 35 to 75 mass %, and an isobutene content of 30 to 60 mass in the presence of a Lewis acid catalyst, such as aluminum trichloride or boron trifluoride. A preferred source of monomer for making poly-n-butenes is petroleum feedstreams such as Raffinate II. These feedstocks are disclosed in the art such as in U.S. Pat. No. 4,952,739. Polyisobutylene is a most preferred backbone because it is readily available by cationic polymerization from butene streams (e.g., using $AlCl_3$ or $BF_3$ catalysts). Such polyisobutylenes generally contain residual unsaturation in amounts of one ethylenic double bond per polymer chain, positioned along the chain. A preferred embodiment utilizes polyisobutylene prepared from a pure isobutylene stream or a Raffinate I stream to prepare reactive isobutylene polymers with terminal vinylidene olefins. Preferably, these polymers, referred to as highly reactive polyisobutylene (HR-PIB), have a terminal vinylidene content of at least 65, e.g., 70, more preferably at least 80, most preferably at least 85%. The preparation of such polymers is described, for example, in U.S. Pat. No. 4,152,499. HR-PIB is known and HR-PIB is commercially available under the tradename Glissopal™ (from BASF).

Polyisobutylene polymers that may be employed are generally based on a hydrocarbon chain of from 400 to 3000. Methods for making polyisobutylene are known. Polyisobutylene can be functionalized by halogenation (e.g. chlorination), the thermal "ene" reaction, or by free radical grafting using a catalyst (e.g. peroxide), as described below.

The hydrocarbon or polymer backbone may be functionalized with carboxylic anhydride-producing moieties selectively at sites of carbon-to-carbon unsaturation on the polymer or hydrocarbon chains, or randomly along chains using any of the three processes mentioned above or combinations thereof, in any sequence.

Processes for reacting polymeric hydrocarbons with unsaturated carboxylic, anhydrides and the preparation of derivatives from such compounds are disclosed in U.S. Pat. Nos. 3,087,936; 3,172,892; 3,215,707; 3,231,587; 3,272,746; 3,275,554; 3,381,022; 3,442,808; 3,565,804; 3,912,764; 4,110,349; 4,234,435; 5,777,025; 5,891,953; as well as EP 0 382 450 B1; CA-1,335,895 and GB-A-1,440,219. The polymer or hydrocarbon may be functionalized, with carboxylic acid anhydride moieties by reacting the polymer or hydrocarbon under conditions that result in the addition of functional moieties or agents, i.e., acid anhydride, onto the polymer or hydrocarbon chains primarily at sites of carbon-to-carbon unsaturation (also referred to as ethylenic or olefinic unsaturation) using the halogen assisted functionalization (e.g. chlorination) process or the thermal "ene" reaction.

Selective functionalization can be accomplished by halogenating, e.g., chlorinating or brominating, the unsaturated α-olefin polymer to 1 to 8, preferably 3 to 7, mass % chlorine, or bromine, based on the weight of polymer or hydrocarbon, by passing the chlorine or bromine through the polymer at a temperature of 60 to 250, preferably 110 to 160, e.g., 120 to 140, for 0.5 to 10, preferably 1 to 7, hours. The halogenated polymer or hydrocarbon (hereinafter backbone) is then reacted with sufficient monounsaturated reactant capable of adding the required number of functional moieties to the backbone, e.g., monounsaturated carboxylic reactant, at 100 to 250, usually 180 to 235 for 0.5 to 10, e.g., 3 to 8, hours, such that the product obtained will contain the desired number of moles of the monounsaturated carboxylic reactant per mole of the halogenated backbones. Alternatively, the backbone and the monounsaturated carboxylic reactant are mixed and heated while adding chlorine to the hot material.

While chlorination normally helps increase the reactivity of starting olefin polymers with monounsaturated functionalizing reactant, it is not necessary with some of the polymers or hydrocarbons contemplated for use in the present invention, particularly those preferred polymers or hydrocarbons which possess a high terminal bond content and reactivity. Preferably, therefore, the backbone and the monounsaturated functionality reactant, (carboxylic reactant), are contacted at elevated temperature to cause an initial thermal "ene" reaction to take place. Ene reactions are known.

The hydrocarbon or polymer backbone can be functionalized by random attachment of functional moieties along the polymer chains by a variety of methods. For example, the polymer, in solution or in solid form, may be grafted with the monounsaturated carboxylic reactant, as described above, in the presence of a free-radical initiator. When performed in solution, the grafting takes place at an elevated temperature in the range of 100 to 260, preferably 120 to 240, °C. Preferably, free-radical initiated grafting would be accomplished in a mineral lubricating oil solution containing, e.g., 1 to 50, preferably 5 to 30, mass % polymer based on the initial total oil solution.

The free-radical initiators that may be used are peroxides, hydroperoxides, and azo compounds, preferably those that have a boiling point greater than 100° C and decompose thermally within the grafting temperature range to provide free-radicals. Representative of these free-radical initiators are azobutyronitrile, 2,5-dimethylhex-3-ene-2, 5-bis-tertiary-butyl peroxide and dicumene peroxide. The initiator, when used, is typically in an amount of between 0.005 and 1% by weight based on the weight of the reaction mixture solution. Typically, the aforesaid monounsaturated carboxylic reactant material and free-radical initiator are used in a weight ratio range of from 1.0:1 to 30:1, preferably 3:1 to 6:1. The grafting is preferably carried out in an inert atmosphere, such as under nitrogen blanketing. The resulting grafted polymer is characterized by having carboxylic acid (or derivative) moieties randomly attached along the polymer chains, it being understood that some of the polymer chains remain ungrafted. The free radical grafting described above can be used for the other polymers and hydrocarbons used in the present invention.

The preferred monounsaturated reactants that are used to functionalize the backbone comprise mono- and dicarboxylic acid material, i.e., acid, or acid derivative material, including (i) monounsaturated $C_4$ to $C_{10}$ dicarboxylic acid wherein (a) the carboxyl groups are vicinyl, (i.e., located on adjacent carbon atoms) and (b) at least one, preferably both, of the adjacent carbon atoms are part of the mono unsaturation; (ii) derivatives of (i) such as anhydrides or $C_1$ to $C_5$ alcohol derived mono- or diesters of (i); (iii) monounsaturated $C_3$ to $C_{10}$ monocarboxylic acid wherein the carbon-carbon double bond is conjugated with the carboxy group, i.e., of the structure —C=C—CO—; and (iv) derivatives of (iii) such as $C_1$ to $C_5$ alcohol derived mono- or diesters of (iii). Mixtures of monounsaturated carboxylic materials (i)-(iv) also may be used. Upon reaction with the backbone, the monounsaturation of the monounsaturated carboxylic reactant becomes saturated. Thus, for example, maleic anhydride becomes backbone-substituted succinic anhydride, and acrylic acid becomes backbone-substituted propionic acid. Exemplary of such monounsaturated carboxylic reactants are fumaric acid, itaconic acid, maleic acid, maleic anhydride, chloromaleic acid, chloromaleic anhydride, acrylic acid, methacrylic acid, crotonic acid, cinnamic acid, and lower alkyl (e.g., $C_1$ to $C_4$ alkyl) acid esters of the foregoing, e.g., methyl maleate, ethyl fumarate, and methyl furnarate.

To provide the required functionality, the monounsaturated carboxylic reactant, preferably maleic anhydride, typically will be used in an amount ranging from equimolar amount to 100, preferably 5 to 50, mass % excess, based on the moles of polymer or hydrocarbon. Unreacted excess monounsaturated carboxylic reactant can be removed from the final dispersant product by, for example, stripping, usually under vacuum, if required.

Metal Detergent (B)

A metal detergent is an additive based on so-called metal "soaps", that is metal salts of acidic organic compounds, sometimes referred to as surfactants. Detergents that may be used include oil-soluble neutral and overbased salicylates, and sulfonates of a metal, particularly the alkali or alkaline earth metals, e.g. sodium, potassium, lithium, calcium, and magnesium. The most commonly used metals are calcium and magnesium, which may both be present in detergents used in the marine fuel composition according to any aspect of the present invention, Combinations of detergents, whether overbased or neutral or both, may be used. They generally comprise a polar head with a long hydrophobic tail. Overbased metal detergents, which comprise neutralized metal detergents as the outer layer of a metal base (e.g. carbonate) micelle, may be provided by including large amounts of metal base by reacting an excess of a metal base, such as an oxide or hydroxide, with an acidic gas such as carbon dioxide.

In the present invention, metal detergents (B) may be metal hydrocarbyl-substituted hydroxybenzoate, more preferably hydrocarbyl-substituted salicylate, detergents. The metal may be an alkali metal (e.g. Li, Na, K) or an alkaline earth metal (e.g. Mg, Ca).

As examples of hydrocarbyl, there may be mentioned alkyl and alkenyl. A preferred overbased metal hydrocarbyl-substituted hydroxybenzoate is a calcium alkyl-substituted salicylate and has the structure shown:

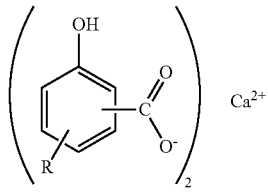

wherein R is a linear alkyl group. There may be more than one R group attached to the benzene ring. The COO⁻ group can be in the ortho, meta or para position with respect to the hydroxyl group; the ortho position is preferred, The R group can be in the ortho, meta or para position with respect to the hydroxyl group.

Salicylic acids are typically prepared by the carboxylation, by the Kolbe-Schmitt process, of phenoxides, and in that case will generally be obtained (normally in a diluent) in admixture with uncarboxylated phenol. Salicylic acids may be non-sulphurized or sulphurized and may be chemically modified and/or contain additional substituents. Processes for sulphurizing an alkyl salicylic acid are well known to those skilled in the art, and are described in, for example, US 2007/0027057. The alkyl groups may contain 8 to 100, advantageously 8 to 24, such as 14 to 20, carbon atoms.

The sulfonates of the invention may be prepared from sulfonic acids which are typically obtained by the sulfonation of alkyl-substituted aromatic hydrocarbons such as those obtained from the fractionation of petroleum or by the alkylation of aromatic hydrocarbons. Examples include those obtained by alkylating benzene, toluene, xylene, naphthalene, diphenyl or their halogen derivatives such as chlorobenzene, chlorotoluene and chloronaphthalene. The alkylation may be carried out in the presence of a catalyst with alkylating agents having from 3 to more than 70 carbon atoms. The alkaryl sulfonates usually contain from 9 to 80 or more carbon atoms, preferably from 16 to 60 carbon atoms per alkyl substituted aromatic moiety. The oil-soluble sulfonates or alkaryl sulfonic acids may be neutralized with oxides, hydroxides, alkoxides, carbonates, carboxylate, sulphides, hydrosulfides, nitrates, borates and ethers of the metal. The amount of metal compound is chosen having regard to the desired TBN of the final product but typically ranges from 100 to 220 mass % (preferably at least 125 mass %) of that stoichiometrically required.

The term "overbased" is generally used to describe metal detergents in which the ratio of the number of equivalents of the metal moiety to the number of equivalents of the acid moiety is greater than one. The term 'low-based' is used to describe metal detergents in which the equivalent ratio of metal moiety to acid moiety is greater than 1, and up to about 2.

By an "overbased calcium salt of surfactants" is meant an overbased detergent in which the metal cations of the oil-insoluble metal salt are essentially calcium cations. Small amounts of other cations may be present in the oil-insoluble metal salt, but typically at least 80, more typically at least 90, for example at least 95, mole % of the cations in the oil-insoluble metal salt, are calcium ions. Cations other than calcium may be derived, for example, from the use in the manufacture of the overbased detergent of a surfactant salt in which the cation is a metal other than calcium. Preferably, the metal salt of the surfactant is also calcium.

Carbonated overbased metal detergents typically comprise amorphous nanoparticles. Additionally, the art discloses nanoparticulate materials comprising carbonate in the crystalline calcite and vaterite forms.

The basicity of the detergents may be expressed as a total base number (TBN), sometimes referred to as base number (BN). A total base number is the amount of acid needed to neutralize all of the basicity of the overbased material. The TBN may be measured using ASTM standard D2896 or an equivalent procedure. The detergent may have a low TBN (i.e. a TBN of less than 50), a medium TBN (i.e. a TBN of 50 to 150) or a high TBN (i.e. a TBN of greater than 150, such as 150-500). The basicity may also be expressed as basicity index (BI), which is the molar ratio of total base to total soap in the overbased detergent.

Embodiments of the Invention

The midstream and upstream operations may be carried out according to ISO20815 2018.

In summary, as is widely understood, midstream operations involve the processing and transportation sectors of the petroleum industry, examples being transportation pipelines and terminals; and upstream operations may involve the transportation of crude oil, including by way of non-limiting example in crude oil production/extraction operations. Therefore, commonly, the hydrocarbon oil in upstream transportation and midstream processing and transportation is crude oil.

In production/extraction operations oil transportation (flow) typically occurs out of the ground to the processing separation units that remove water and then to storage for removal from the field. Asphaltene precipitation can occur in the riser or above ground, for example with the mixing of oil from multiple wells into the storage tanks. Upstream transportation may include processing steps such as water separation, gas separation, solids separation or upgraders used to thermally or catalytically crack the oil, or solvent wash the oil, near the production site to reduce the viscosity ahead of transportation to the refinery, for example to meet midstream or refinery specifications. Accordingly, upgrading may be viewed as improving the properties of a crude oil for subsequent operations, accordingly resulting in an upgraded crude oil, as opposed to resulting in a refined product. Upstream processing steps may additionally or alternatively involve the use of other additives such as for water separation, gas separation, wax deposit prevention, asphaltene deposit prevention, scale prevention and corrosion prevention. All of the above-mentioned processing steps may also take place during midstream operations. Both upstream and midstream operations can also include storage and blending in relation to their respective activities. While upstream transportation typically occurs via pipeline (although may additionally or alternatively include other transportation methods), midstream processing and transportation may involve a variety of transportation methods including but not limited to the use of trucks, rail, ships (oil tankers), barges and pipelines as well as multiple storage locations between transportation steps and further storage outside an oil refinery.

On the other hand, downstream operations are generally understood to commence with (at the point of) refining activities and include subsequent exploitation of the refined products obtained, for example as lubricant base stocks, finished lubricants, petrochemicals and fuels such as gasoline, Diesel or heavy fuel oil. In some embodiments, therefore, downstream processes in the present disclosure occur from the point at which a hydrocarbon oil, such as a crude oil, enters an oil refinery, enters an oil refinery process or enters a heating unit prior to a desalting unit in an oil refinery, whereas midstream processes and transportation and upstream transportation occur prior to this point. Midstream processes and transportation and upstream transportation in the present disclosure may therefore together occur before the hydrocarbon oil (e.g. crude oil) enters, or has entered, an oil refinery or a crude hydrocarbon refinery component. As used herein, "crude hydrocarbon refinery component" generally refers to an apparatus or instrumentality of a process to refine crude hydrocarbons, such as an oil refinery process. Crude hydrocarbon refinery components are located within an oil refinery, and include processes carried out for the purpose of making refined product. Typical crude hydrocarbon refinery components include but are not limited to: heat transfer components such as a heat exchanger, a furnace, a crude preheater, crude distillation tower, vacuum distillation tower a coker preheater, or any other heaters, a FCC slurry bottom, a debutanizer exchanger/tower, other feed/effluent exchangers and furnace air preheaters in refinery facilities, flare compressor components in refinery facilities and steam cracker/reformer tubes in petrochemical facilities. Crude hydrocarbon refinery components can also include other instrumentalities in which heat transfer can take place, such as a fractionation or distillation column, a scrubber, a reactor, a liquid-jacketed tank, a pipestill, a coker and a visbreaker.

The present invention contemplates an additive combination which may comprise, consist or consist essentially of additives (A) and (B). Accordingly, while treat rates of the additive combination referred to herein contemplate the combined treat rate to the hydrocarbon oil (such as a crude oil) of the active ingredients (A) and (B), it is to be understood that the additive combination may be present in, or introduced to, the hydrocarbon oil in combination with, or simultaneously to, solvents, diluents or other additives such as emulsion-breakers (for demulsification), corrosion inhibitors (preferably water-soluble), hydrate inhibitors, scale inhibitors, flow improvers, wax deposition inhibitors (or paraffin suppressants), pour point depressants, viscosity improvers and/or other fluids. Further components such as those listed above may be additionally or alternatively added or blended with the hydrocarbon oil separately to the additive combination referred to in the invention, for example before or after the additive combination. Alternatively stated, an indication herein that the additive combination consists of additives (A) and (B) does not preclude the addition of further additives in general to the hydrocarbon oil, such as crude oil, including by way of non-limiting example by combining the additive combination (which may mean combining additives (A) and (B) separately) with further additives to form an additive package for the hydrocarbon oil.

The mass:mass ratio of (A) to (B) may be in the range of 1:1 to 1:6 such as 1:1 to 1:3.

Among these ratios there may be mentioned:
1(PIBSA): 3(salicylate);
1(PIBSA): 3 (salicylate): 3(sulfonate);
1(PIBSA): 2(salicylate): 2(sulfonate); and
1(PIBSA): 1(salicylate): 1(sulfonate).

In (B), the or each detergent may have a TBN in a range with a lower limit of 0, 50, 100 or 150 and with an upper limit of 300, 350, 400, 450 or 500.

In (B), the or each component detergent may be present as an overbased detergent.

Additives (A) and (B) may be used with or as emulsion-breakers (for demulsification), corrosion inhibitors (preferably water-soluble), hydrate inhibitors, scale inhibitors, flow improvers, wax deposition inhibitors (or paraffin suppressants), pour point depressants, viscosity improvers and/or other fluids.

EXAMPLES

The following non-restrictive examples illustrate the invention.

Crude Oils

The following were used:

| Crude No. | Sulfur Content (% wt/wt) |
|---|---|
| 1 | 3.86 |
| 2 | 3.9 |
| 3 | 3.25 |
| 4 | 0.493 |
| 5 | 0.012 |
| 6 | not measured |

Additive Components

The following were used:
(A) 80% polyisobutene succinic anhydride ("PIBSA") derived from a polyisobutene having a number average molecular weight of 950 and 20% diluent in the form of SN150, a Group I oil
(B1) an overbased calcium salicylate detergent having a TBN of 225
(B2) an overbased calcium sulfonate detergent having a TBN of 302.

Test Methods

The following were applied:

Crude Oil Asphaltene Stability (Covers "Inhibition")

The test is carried out in a modified version of the equipment of ASTM D7157 and demonstrates the ability of a crude oil to resist destabilisation upon the addition of heptane. Results are recorded as 'S' values, the intrinsic stability of the oil with respect to precipitation of asphaltenes. Higher 'S' values indicate that the oil is more stable in respect to asphaltene flocculation.

Asphaltene Dispersancy

The test observes the settling rate with respect to asphaltene agglomerates settling to the bottom of a vessel (tube) and measures the ability of additives to disperse flocculated asphaltene. Testing is carried out at ambient temperature and pressure and results expressed as mL/h of sediment. This procedure involves taking 0.5 g of an asphaltenic crude oil and diluting with approximately 0.5 mL of toluene, in the presence or absence of an additive. An excess of a paraffinic fluid (up to 100 mL), typically heptane, is added and the vessel is shaken thoroughly. The tube is then left to settle where a camera monitors the settling rate of asphaltenic agglomerates/particles over time, with lower rate values indicating superior results.

DEPOSIT CONTROL

This test measures the reduction of asphaltene deposited on heated surfaces. Tests were carried out using 150 ml samples of the crude oil blend containing no additives (as a control) and containing either 1000 or 500 ppm by mass of additive component(s) as indicated in the results table below, added to the blend as a cutback. As a comparison with the prior art, a test was carried out with a succinimide additive comprising the reaction product of a PIBSA (1000 MW) and tetraethylene pentamine (42% ai and base number 44 in KOH/g (referred to in the results table below as PIBSA-PAM).

The tests used a custom-built rig test which aims to simulate refinery antifoulant performance. The rig is an instrument having five independently-heated test sections in series. Each test section comprises an electrically resistively-heated steel rod encased in an outer steel jacket, which is electrically isolated from the rod. The test crude sample flows in the cavity between the rod and the jacket. The rod temperature is controlled at the centre point of the rod and is maintained constant throughout the test.

As the crude flows over the hot rod, it absorbs heat from the rod; the temperature of the fuel leaving the test section is recorded.

If deposits accumulate on the rod surface, they reduce the heat transfer efficiency from the rod to the crude thus giving rise to a reduction in the temperature of the crude leaving the test section.

The difference in crude outlet temperature between the start to the end of the test is calculated and summed for all five rods. A larger number indicates a greater temperature difference and hence worse fouling.

Tests were carried out for six hours with respective rod temperatures of 125, 195, 235, 275 and 315, ° C.; and for five hours with respective rod temperatures of 120, 160, 200, 240 and 280, ° C.

Results are expressed in mg of deposit.

EXPERIMENTAL PROCEDURE AND RESULTS

The crude oils, with or without additive treatment, were tested using the three tests above. Results are summarised in the table below.

| | | | | TEST RESULTS/OILS | | | | | |
|---|---|---|---|---|---|---|---|---|---|
| | Additive Components | | | INHIBITION (S values) | | | DISPERSANCY (mL/h) | | DEPOSIT (mg) |
| Example | A | B | Ratio* | 3/5 | 1/4/6 | 2/5 | 3 | 2 | 1/4/6 |
| Control | — | — | | 1.402 | 1.122 | 1.364 | 40.00 | 1.66 | 1143.4 |
| 1 | ✓ | Sali | 1:3 (683) | | | 1.494 | | 0.8 | 50.0 |
| 2 | ✓ | Sali(2) | 2:1:1 (1725) | 1.801 | | 1.499 | 2.5 | 0.03 | |
| 3 | ✓ | Sali(2) | 1:3:3 (669) | | | 1.49 | | 1.41 | 41.3 |
| 4 | ✓ | Sali(2) | 1:3:3 (334.5) | | | 1.459 | | | 44.4 |
| 5 | ✓ | Sali | 1:1 (1725) | | | 1.576 | 0.01 | 0.01 | |
| 6 | ✓ | Sali | 1:1 (710) | | | 1.531 | 1.50 | 1.41 | |
| 7 | ✓ | Sali | 1.5 (1758) | | 1.594 | 1.543 | | 0.01 | |
| 8 | ✓ | Sali | 1:10 (1754.5) | | 1.597 | 1.561 | | 0.01 | |
| 9 | ✓ | Sali | 1:3 (705) | | | 1.482 | | 0.03 | 19.1 |
| 10 | ✓ | Sali | 1:1 (670) | | | 1.414 | | | 41.2 |
| 11 | ✓ | Sali/Sulf | 1:1:1 (657) | | | 1.469 | | 0.36 | |
| 12 | ✓ | Sulf | 1:1 (635) | | | 1.440 | | | |
| 13 | ✓ | Sali/Sulf | 1:2:2 (664) | | | 1.427 | | 0.03 | |
| 14 | ✓ | Sali/Sulf | 1:3:3 (639) | | | 1.430 | | 0.03 | |

-continued

| | Additive Components | | | TEST RESULTS/OILS | | | | | |
|---|---|---|---|---|---|---|---|---|---|
| | | | | INHIBITION (S values) | | | DISPERSANCY (mL/h) | | DEPOSIT (mg) |
| Example | A | B | Ratio* | 3/5 | 1/4/6 | 2/5 | 3 | 2 | 1/4/6 |
| Comparative 1 | x | Sali | | | (620) | | | | 66.7 |
| Comparative 2 | ✓ | X | | | (720) | | | | 68.6 |
| Comparative 3 | x | Sali | | | (670) | | | | 94.8 |

*Treat Rate; active ingredient

It is seen that Examples 1-14 of the invention generally perform better than the Control and better than the Comparative Examples 1-3.

The invention claimed is:

1. A method for reducing fouling and/or asphaltene agglomeration (or flocculation) in midstream processes and transportation and in upstream transportation of a crude oil, including storage and blending, comprising providing in the crude oil an additive combination comprising:
   (A) polyalkenyl-substituted carboxylic acid or anhydride, and
   (B) a metal detergent system comprising a hydrocarbyl-substituted hydroxybenzoate metal salt or a hydrocarbyl-substituted sulfonate metal salt or a mixture of both salts or a complex thereof;
where the mass:mass ratio of (A) to (B) is in the range of 20:1 to 1:20, and the treat rate of the additive combination is in the range of 10 to 1000 ppm by mass.

2. The method of claim 1 wherein the mass:mass ratio of (A) to (B) is in the range of 10:1 to 1:10.

3. The method of claim 1 wherein die mass:mass ratio of (A) to (B) is in the range of 3:1 to 1:3.

4. The method of claim 1 wherein the treat rate of the additive combination is in the range of 500 to 1,000 ppm by mass.

5. The method of claim 1 where the midstream processes and transportation and the upstream transportation are according to ISO 20815 2018.

6. The method of claim 1 where the mass:mass ratio of (A) to (B) is in the range 1:1 to 1:6.

7. The method of claim 1 where the mass:mass ratio of (A) to (B) is in the range of 1:1 to 1:3.

8. The method of claim 1 where, in (A), the polyalkenyl substituent has from 8 to 400 carbon atoms.

9. The method of claim 1 where, in (A), the polyalkenyl substituent has a number average molecular weight of from 350 to 2000.

10. The method of claim 1 where, in (A), the polyalkenyl subsituent has a number average molecular weight of from 500 to 1000.

11. The method of claim 1 where (A) is a polyalkenyl-substituted succinic acid anhydride.

12. The method of claim 11 where (A) is a polyisobutene succimic acid anhydride.

13. The method of claim 1 where, in (B), the metal is calcium.

14. The method of claim 1 where, in (B), the hydrocarbyl-substituted hydroxybenzoate is a hydrocarbyl-substituted salicylate.

15. The method of claim 1 where, in (B), the hydrocarbyl group has from 8 to 100 carbon atoms.

16. The method of claim 1 where, in (B), each detergent in the metal detergent system has a TBN in a range with a lower limit of 0 and with an upper limit of 500.

17. The method of claim 1 wherein in (B), each detergent in the metal detergent system is present as an overbased detergent.

18. The method of claim 1 wherein the crude oil is additionally provided with one or more of emulsion-breakers (for demulsification), corrosion inhibitiors, hydrate inhibitiors, scale inhibitiors, flow improvers, wax deposition inhibitors, pour-point depressants, viscosity improvers, and combinations thereof.

* * * * *

UNITED STATES PATENT AND TRADEMARK OFFICE
CERTIFICATE OF CORRECTION

PATENT NO. : 10,995,287 B2
APPLICATION NO. : 16/707253
DATED : May 4, 2021
INVENTOR(S) : Kerby et al.

Page 1 of 1

It is certified that error appears in the above-identified patent and that said Letters Patent is hereby corrected as shown below:

In the Claims

In Claim 1, at Column 13, Line 26, add --a-- after (A).

In Claim 3, at Column 13, Line 37, delete "die" and insert therefor --the--.

In Claim 12, at Column 14, Line 27, delete "succimic" and insert therefor --succinic--.

Signed and Sealed this
Twenty-second Day of June, 2021

Drew Hirshfeld
*Performing the Functions and Duties of the
Under Secretary of Commerce for Intellectual Property and
Director of the United States Patent and Trademark Office*